United States Patent Office 3,262,801
Patented July 26, 1966

3,262,801
PROCESS OF PREPARING FINELY DIVIDED
SILICAS OF VARIED PROPERTIES
Robert E. Lally, Verona, and Frederick J. Ihde, Jr., Mountain Lakes, N.J., assignors to Nopco Chemical Company, Newark, N.J., a corporation of New Jersey
No Drawing. Filed Jan. 30, 1963, Ser. No. 255,091
5 Claims. (Cl. 106—288)

This invention relates to a process for preparing finely divided silicas of varied properties. More particularly this invention relates to a process for preparing a family of finely divided silicas of varied properties and to the novel silicas thereby produced. These silicas are especially adapted to be used as thickening agents and flatting agents.

Silicas which have high bulking values have been used as flatting agents for various surface coating agents such as paints, varnishes and lacquers to cut down the glare and to temper the color of the surface finishes produced by these coating agents. These silica flatting agents are incorporated into the surface coating agents by preparing a concentrated dispersion (known as a master batch) of the silica and a liquid which acts as a carrier or solvent for the surface coating agent. These master batches are prepared by ball-milling silica and the liquid medium to the desired smoothness. This master batch is then mixed with a varnish or a lacquer in proportions to obtain a finished product having the desired degree of flatting. In the past the silicas which have the high bulking properties necessary to produce a good flatting agent for paints, varnishes, etc., cause undue thickening of the liquid medium in which it is incorporated. This thickening of the liquid medium by the silica particles prevents the paste from being successfully ground in a ball mill so that when it is mixed with the surface coating agents, a nice uniform dispersion cannot be obtained. Hence the surface coating agents containing these silicas, which are applied to surfaces, form uneven and blotchy coats and finishes upon the surfaces on which they are applied. This is due to the high thickening properties of these silica flatting agents. In order to combat this, workers in the field have resorted to utilizing lower concentrations of silica in the master batch. This procedure increases the number of master batches which must be prepared with the resultant increase in ball mill time, power consumption, loading and discharging, in order to produce a finished product having the desired degree of flatting. In an attempt to solve this problem, coarse silicas which have low thickening power had been utilized in forming the paste for the surface coating agents. These pastes formed with the coarse silicas have also not been entirely satisfactory since they require excess grinding to reduce the coarse particles within the paste to finer particles which will have the proper refractive properties to act as flatting agents for the surface coating agents. Besides the increased cost of excessive grinding, it has been found that these ground silicas still do not have the required reflective and diffusive properties for cutting the glare and tempering the color of the coated surface treated with the surface coating agents. Hence the optimum solution of these problems is to find a silica that has good light diffusion properties or high bulking values and a low thickening power. However, until the present time, such a silica has been unavailable.

On the other hand, in some cases, it has been desirable to utilize silicas having a high bulking value and a high thickening power such as in the case of producing grease by thickening oils. In this case, the high bulking value of silica allows the fine particles of the silica to be dispersed in oil and the oil is then thickened to a grease as a result of the high thickening power of silica. In other cases, such as in utilizing silica as a carrier for such materials as pesticides, herbicides, etc. a silica with a low bulk value and a low thickening power is desired. In this case, the low bulk value allows the silica to occupy a small volume percentage of the pesticide composition so that the silica can act as a diluent for this material without thickening the material. Previously, in utilizing silicas for use as flatting agents, carriers and grease thickeners, different silicas produced from different sources had to be used to provide the desired bulking value or thickening property. This is due to the fact that a silica produced from a single source had only a specific set of properties, especially as regards bulking values and as regards thickening properties.

Hence it is an object of this invention to provide a new and novel silica whose properties such as bulking and oil thickening can be varied to any desired degree.

Another object of this invention is to provide a process for preparing a family of silicas having varied properties.

Another object of this invention is to prepare a carbonized silica.

Another object of this invention is to prepare a new and novel silica having a high bulking value and a low thickening power for use as a flatting agent, heat resisting agent, reinforcing agent and anti-slip agent.

Another object of this invention is to prepare a silica having a high bulking value and a high thickening power.

Another object of this invention is to prepare a silica having a low bulking value and a low thickening power.

Other objects will become apparent from the detailed description given hereinafter. It is intended, however, that the detailed description and specific examples do not limit the invention, but merely indicate the preferred embodiments of the invention since various changes and modifications with the scope of the invention will become apparent to those skilled in the art.

We have unexpectedly discovered that by igniting a siliceous amino amide composition containing from about 5% to 100% by weight of said siliceous amino amide composition of the reaction product of a compound selected from the group consisting of water soluble or water dispersible salts of partial amides and water soluble or water dispersible salts of oxazolines and water soluble or water dispersible salts of imidazolines and mixtures thereof with a water soluble silicate salt and from about 0% to 95% by weight of free or uncombined silica at temperatures of from about 450° F. to 2,500° F., silicas can be produced that have a wide variety of properties such as bulking and oil thickening properties, depending upon the ignition temperature that is used. Hence by varying the ignition temperature of the siliceous amino amide composition, a silica having desired bulking values and oil thickening properties can be produced. By use of this invention it is possible to produce a silica having low thickening properties and high bulking values so as to be ideally suited as a flatting agent for surface coating agents.

The phenomena whereby the properties of a silica can be controlled by igniting a siliceous amino amide composition within the disclosed temperature range is not completely understood, however, it is believed that the results are attributable to the specific silica structures which are produced by igniting this siliceous amino amide composition within the aforementioned temperature ranges. The ignition of siliceous amino compositions results in the complete destruction and removal of organic matter. Moreover and most unexpectedly, the removal of the organic matter in this manner as in most cases does not bring about the collapse of the silica with resultant rock like formation if the ignition is carried out within disclosed temperature ranges. On the contrary, a unique structurally honeycombed silica product is obtained. This structure is of especial value when finely divided silicas are used in greases, polyester and solvent thickening, flatting, reinforcing and many other known uses of silica.

Any suitable ignition apparatus may be used in carrying out the ignition of the siliceous amino amide composition, e.g., a gas fired furnace, a high temperature flash chamber, or an electrical ignition apparatus and the like may be used. Thus, this invention is not to be construed as being limited to the selection and use of any particular ignition apparatus. The ignition temperature may vary from about 450° F. up to a temperature just below the melting or fusion point of the silica. Generally speaking, 2,500° F. has been found to be a practical upper limit. While ignition temperatures above about 2,500° F. may be used, it is not desirable to use such high ignition temperatures because there is no advantage in so doing. Besides, there is the disadvantage of the additional cost in maintaining higher temperatures. Ignition temperatures below 450° F. are not desirable because such low ignition temperatures will not adequately decompose the organic portion of the siliceous amino amide composition unless special conditions are used such as a high oxygen atmosphere.

We have found that the properties of the resultant silica are directly related to the ignition temperatures used. Generally speaking, at ignition temperatures of from about 450° F. to about 1400° F. a finely divided silica is obtained with a high bulking value, and a high solvent thickening power, these silicas being useful for thickening oils to produce greases. At ignition temperatures of from about 1450° F. to about 1600° F. a finely divided silica having a high bulking value and low solvent thickening power is obtained. As pointed out before, these silicas are useful as flatting agents for surface coating agents, such as varnishes, paints, etc. At ignition temperatures of from about 1600° F. and upwards, preferably from 1650° F. and upwards, to the fusion point of the silica, finely divided silicas having low bulking values and low solvent thickening properties are obtained. These silicas are useful as carriers for insecticides, herbicides, etc. It should be noted that the line of demarcation is not as sharp as is indicated by the ignition temperature ranges given. However, we have found that at temperatures of from 450° F. to 1350° F. finely divided silicas with high bulking values and high solvent thickening powers are obtained, at temperatures of from 1450° F. to 1600° F. finely divided silicas having high bulking values and low solvent thickening power are obtained and at temperatures of from 1650° F. to 2500° F. finely divided silicas having low bulking values and low solvent thickening powers are obtained.

If desired, the decomposition products of the ignition may be recovered. It should also be mentioned that generally speaking, the lower the ignition temperature, the more fuming and smoking is encountered.

In accordance with this invention it has been found that to ignite and burn a siliceous amino amide composition when it is still in the wet filter cake stage is generally preferred. By igniting and burning a wet filter cake, the step of drying and the resultant economic disadvantages thereunto appertaining are diminished. More important, however, it has been found that for some inexplicable reason, if a wet filter cake is ignited and burned, a greater oil thickening power as compared to a dry siliceous amino amide composition ignited and burned at a corresponding temperature, is obtained.

Instead of completing the ignition and destroying the organic matter of the siliceous amino amide composition, the organic matter may be partially destroyed by decomposing the siliceous amino composition in an atmosphere composed of its own decomposition products. This is done by heating the siliceous amino amide composition to a temperature of from 400° F. to 1,000° F. in the absence of oxygen until the formation of the carbonized silica which is indicated by the cessation of smoke coming off from the silica. This indicates that all the volatile matter and impurities have been driven off, leaving pure carbonized silica. In most cases this occurs by heating the siliceous amino amide at a temperature of 400° F. to 1,000° F. for a period of at least a half hour. Any heating period greater than one half hour may be utilized but generally excess heating does not produce any different results. Therefore, in practice, heating periods of over ten hours are seldom used, due to the cost of heating at this temperature. By so doing, carbonized silicas are obtained. By the term oxygen free atmosphere, it is meant an atmosphere containing no oxygen and generally containing the volatile gaseous matter given off during the decomposition of the siliceous amino amide composition. The atmosphere may contain inert gases such as nitrogen, argon, neon, etc. in addition to the gases produced by the decomposition of the siliceous amino amide composition.

By carbonized silicas, we mean silicas coated with organic matter or carbon in various degrees of decomposition. The carbon and other decomposition products of such carbonized silicas are both interspersed within the silica particles and coated upon them. These carbonized silicas can advantageously be incorporated into rubber because the carbon and other decomposition products aid the incorporation of silica into rubber. Carbonized silicas can be used in gas purification and other fields.

The siliceous amino amide composition which is ignited at temperatures of from about 450° F. to about 2,500° F. to produce silicas having the aforementioned predetermined properties are prepared according to U.S. Patent No. 2,967,828, Ihde, issued January 1961 and copending applications Serial Nos. 83,086, filed August 26, 1959, now Patent No. 3,129,181; 86,323, filed February 1, 1961, now Patent No. 3,168,539; 107,320, filed May 3, 1961, now Patent No. 3,129,177; 121,350, filed July 3, 1961; 138,566, filed September 18, 1961, now Patent No. 3,129,-177; and 166,907, filed January 17, 1962, now Patent No. 3,129,176. The above disclosed patent and patent applications are hereby incorporated herein by reference.

In general, siliceous amino amide compositions can be prepared by reacting at least stoichiometric amounts of a water soluble silicate salt such as sodium silicate, potassium silicate, ammonium silicate and the like with any one of, or a mixture of partial amide salts, such as the acetate salt of the monoamide of hydrogenated tallow fatty acids and tetraethylene pentamine, and the like; imidazoline salts such as the sulfate salt of the imidazoline compound of two moles of stearic acid with one mole of diethylene triamine, and the like; oxazoline salts such as the propionate salt of the oxazoline compound of one mole of monoethanolamine with one mol of lauric acid, and the like; quaternary ammonium salts such as dimethyl dioctadecyl ammonium chloride, and the like; and amine acid addition salts.

While the above is the basic reaction, conditions may be varied so that an excess of the water-soluble silicate salt is present which is converted by reacting with an acid such as sulfuric acid to a water-insoluble silica gel or sol. When an excess of the water soluble silicate salt is used, the resultant reaction product is absorbed and/or complexed upon the surface of the silica formed by reacting the acid with the excess of the water-soluble silicate salt. Generally, it is preferred to react the excess silicate salt with the acid to convert the water-soluble silicate salt to a colloidal fine silica such as a silica gel or sol before reacting at least a stoichiometric amount of the water soluble silicate salt with the partial amide salt, imidazoline salt, etc. or mixtures thereof, so that this reaction product is formed in the presence of said gel or sol. In this manner, the reaction product is adsorbed and/or complexed on the silica gel or sol forming the siliceous amino amide composition. Alternatively, the partial amide salt, amine acid addition salt, etc. may be initially reacted with an excess of the water-soluble silicate salt and the excess water soluble silicate salt then converted by reacting with the acid to form the water insoluble silica gel or sol or both of the above methods for preparing a siliceous amino amide composition containing free silica may be combined. In this manner a water-soluble silicate salt is converted simultaneously to water-insoluble silica and to its reaction products with the partial amide salts, water soluble or water dispersible salts of oxazolines and water soluble or water dispersible salts of imidazolines and mixtures thereof. Thereafter the partial amide salt, oxazoline salt, etc. or mixtures thereof and additional excess water-soluble silicate salt are added and reacted in the presence of the silica and the siliceous amino amide composition. The additional excess water-soluble silicate salt is then converted to the free colloidal silica particles by treatment with an acid such as hydrochloric acid and the like. The siliceous amino amide composition which may be prepared by any of the aforementioned processes can contain up to about 95% by weight, of the siliceous amino amide composition of silica in the form of insoluble particles, hereinafter referred to as free silica and at least 5% by weight of the siliceous amino amide composition in the form combined with either partial amide salt, the oxazoline salt, the imidazoline salt, or the quaternary ammonium salt, hereinafter referred to as the combined silica. The composition may contain up to 100% by weight of combined silica, based on the weight of the entire composition.

Additives, such as fluosilicic acid or a water-soluble fluosilicate salt may also be added in preparing the siliceous amino amide composition as described in copending application Serial No. 86,323, now Patent No. 3,168,539. Generally speaking, the fluosilicic acid or fluosilicate salts may be present at any stage before or during the formation of the siliceous amino amide composition. Among the water-soluble fluosilicate salts which can be used are sodium fluosilicate, potassium fluosilicate, ammonium fluosilicate, magnesium fluosilicate, manganese fluosilicate, nickel fluosilicate, aluminum fluosilicate, rubidium fluosilicate, cesium fluosilicate, silver fluosilicate, cobaltous fluosilicate, thallium fluosilicate, zinc fluosilicate, cupric fluosilicate, lithium fluosilicate, hydrazine fluosilicate, hydroxylamine fluosilicate, amine fluosilicate, and the like.

Additives such as aromatic compound, i.e., isophthalic acid, terephthalic acid, and water-soluble salts thereof may also be used during the preparation of the siliceous amino amide compositions. The use of isophthalic acid, terephthalic acid, and their water-soluble salts in preparing siliceous amino compositions is described in copending patent application Serial No. 107,320, filed May 3, 1961, now Patent No. 3,129,178.

The isophthalic acid, terephthalic acid or water-soluble salts thereof can be added at any time during the preparation of the siliceous amino composition, prior to the step of drying the filter cake. If desired, isophthalic acid or terephthalic acid can be added in such a manner so that the acid remains part of the siliceous amino composition and is interspersed in and around the particles of the siliceous amino composition. This is done by precipitating isophthalic acid or terephthalic acid at any time before removing water from the reaction slurry containing the siliceous amino amide composition. In this case, the slurry must be acid, before water is removed by filtering, decanting, centrifuging or the like. If it is alkaline, then the isophthalic or terephthalic acid will be converted to its water-soluble salts, and upon filtering and washing the filter cake, or upon removing water in any other manner such as by centrifuging and the like, the water-soluble salt will be substantially removed and the siliceous amino amide composition will be devoid of isophthalic or terephthalic acid.

If salts of imidazolines or oxazolines or mixtures of short and long chain partial amides are used to prepare a siliceous amino amide composition then the procedure described in copending patent applications Serial Nos. 121,350 filed July 3, 1961, and 138,566 filed September 18, 1961, now Patent No. 3,129,177, can be utilized. Generally speaking, these two patent applications relate to the removal of ordinarily non-removable water from siliceous amino amide compositions prepared using such salts, before drying said siliceous amino amide composition. After a siliceous amino amide composition has been prepared using said imidazoline or oxazoline salts according to copending patent application Serial No. 121,350, or a mixture of short and long chain partial amide salts acording to copending patent application Serial No. 138,566, now Patent No. 3,129,177, water is initially mechanically removed as by filtering, centrifuging, decanting, and the like. Thereafter the siliceous amino amide composition is frozen, thawed out, and water is again removed, by filtering the thawed out cake.

The mixture of the long and short chain partial amide salts referred to above is the reaction products of a mixture of long and short chain partial amides with an acid such as acetic acid, propionic acid, hydrochloric acid, sulfuric acid, phosphoric acid, and the like. The short chain partial amides are reaction products of a polyamine with a four or five carbon acid such as butyric acid, valeric acid, crotonic acid, alpha chloro butyric acid and the like and the long chain partial amides are reaction products of a polyamine with an acid of at least twelve carbon atoms such as lauric, tridecoic, myristic, pentadecanoic, margaric, stearic, nondecyclic, arachidic, oleic, linoleic, ricinoleic, palmitic, hydrogenated tallow fatty acids, naphthenic, tall oil acids, abietic acid and the like.

In all of the aforedescribed methods and variations for preparing a siliceous amino amide composition, one or more water-insoluble organic liquids, as described in copending application Serial No. 836,086, filed August 26, 1959, now Patent No. 3,129,181, may be added at any time to the reaction media before the formation of the siliceous amino amide composition. Some of the water-insoluble organic liquids which can be used in the preparation of the siliceous amino amide composition include Varnish Makers and Painters Naphtha, xylene, n-butanol, capraldehyde, benzene, vegetable and fish oils, and the like. Moreover, we can use water-insoluble materials which are solids at room temperature, but are liquids at the operating temperatures of our process, such as eicosane, paraffin wax and the like, in place of this water-insoluble organic liquid in the preparation of the siliceous amino amide composition.

Serial No. 166,907, Ihde, filed March 1, 1962, now Patent No. 3,129,176, described novel siliceous amino amide compositions and processes for preparing the same. These siliceous amino amide compositions are prepared by reacting a water-soluble silicate salt such as sodium silicate, potassium silicate, ammonium silicate, and the like with partial amide salts or mixtures of partial amide salts, water soluble or water dispersible salts of oxazolines and water soluble or water dispersible salts of imidazolines and mixtures thereof containing at least one primary amine group in the manner hereinbefore described except that after the reaction slurry containing the siliceous amino composition is formed, a metal or metal salt is then reacted with the reaction product of the partial amide salts, water soluble or water dispersible salts of oxazolines and water soluble or water dispersible salts of imidazolines and mixtures thereof, with the water-soluble silicate salt while it is in slurry form. If desired, a metal or metal salt can be reacted with this reaction product after it has been recovered from this slurry and dried. These siliceous amino amide compositions prepared in this manner can be converted into silicas having the above-mentioned varied properties by igniting at the above-mentioned temperatures.

The siliceous amino amide composition utilized in this invention containing about 5 to about 100% by weight of the composition of the reaction product of a compound selected from the group consisting of water-soluble or water-dispersible salts of partial amides, water soluble or water dispersible salts of oxazolines and water soluble or water dispersible salts of imidazolines and mixtures thereof with a water-soluble silicate salt and from about 0% to 95% by weight of the uncombined or free silica. Generally, it is preferred to utilize a siliceous amino amide composition containing from about 10% to 40% by weight of the composition of the reaction product of a water-soluble silicate salt with a compound selected from the group consisting of water-dispersible or water-soluble partial amide salts, water soluble or water dispersible salts of oxazolines and water soluble or water dispersible salts of imidazolines and mixtures thereof and from about 60 to 90% by weight of the composition of unreacted or free silica.

The term bulking value is defined as the volume a ten gram sample of silica occupies. This value is an indication of the fine particle size of the silica since generally speaking the higher the bulking values, the finer the particle size of the silica. It is through the fine particle size of the silica that the flattening of surface coating agents such as paints, varnishes, lacquers, etc. is accomplished.

Wherever bulking values are given in the following examples, it is determined by placing a ground ten gram sample of the silica in 100 cc. graduated cylinder and measuring and recording the volume of this ten gram sample. If the volume of the ten gram sample exceeds 100 cc. then a five gram sample is used and the bulking value is multiplied by two. The bulking value of a given sample is taken twice, once when it is placed in the cylinder and again when the silica has been compacted. The silica is compacted by tapping the cylinder containing the 10 gram sample of silica sixty times on a hard surface and then recording the volume which the ten gram sample occupies after tapping. Where the bulking values are given in the following examples, the first number is the volume the ten gram sample occupied before tapping. Generally speaking, the higher the pair of bulking volume, the finer the particle size of the silica tested and the better the reflective and diffusive properties.

In order to more fully illustrate the nature of this invention and the manner of practicing the same the following examples are presented. These examples should not be construed in a limiting manner.

EXAMPLE I

The siliceous amino amide compositions used in this example was prepared substantially as follows:

(A) *Preparation of the silica sol*

3.0 lbs. of isophthalic acid and 14 lbs. 6 oz. of a 40° Bé. sodium silicate ($Na_2O:3.22SiO_2$) solution were dissolved in 240 lbs. of water. The resultant clear sodium isophthalate solution was diluted by the addition of 170 lbs. of water thereto. The solution was then agitated while heating to a temperature of 80° C. and diluted with 220 lbs. of water.

A magnesium sulfate solution containing 2 lbs. 14 oz. of magnesium sulfate ($MgSO_4.7H_2O$) dissolved in 15 lbs. of water was slowly added to the solution containing sodium isophthalate. A cloudy slurry formed indicating a build up of silica particles. The slurry was allowed to cool to 50° C. whereupon 1.5 lbs. of sodium fluosilicate was dissolved therein. The slurry was then cooled to 40° C.

A diluted sulfuric acid solution prepared by adding 9 lbs. 2 oz. of an aqueous solution containing 96% by weight of sulfuric acid to 52 lbs. of water, was added to the cloudy slurry until the slurry gave an acid reaction to Congo red paper. The remaining sulfuric acid solution and 45 lbs. 8 oz. of a 40° Bé. sodium silicate ($Na_2O:3.22SiO_2$) solution diluted with 45 lbs. of water, were then slowly added, at the same time, to the cloudy slurry in order to form the silica sol and the aromatic acid. During the addition of the two solutions to the slurry, the slurry was constantly agitated. Care was taken to keep the sulfuric acid in excess at all times so that the slurry was acid to Congo red paper at all times. Upon completion of this addition, the milky slurry was heated with agitation to 55° C.

(B) *Preparation of the partial amide salt*

3.0 lbs. of the monoamide of hydrogenated tallow fatty acids and aminoethylethanolamine were dissolved in 60 lbs. of varnish makers' and painters' naphtha at a temperature of from 80° C. to 85° C. To this clear solution, there was added 382 grams of glacial acetic acid thus forming a clear solution of monoamide acetate salt.

(C) *Preparation of the siliceous amino amide composition*

The partial amide salt solution prepared above in part B and a sodium silicate dilution prepared by diluting 36 lbs. 9 oz. of a 40° Bé. sodium silicate ($Na_2O:3.22SiO_2$) solution with 40 lbs. of water, were slowly added at the same time to the silica sol of part A. When the partial amide salt solution and the sodium silicate dilution were added to the silica sol, the water soluble sodium salt of isophthalic acid formed from the aromatic acid present in the silica sol and the water insoluble siliceous amino composition formed at the same time. During this addition, the silica sol was agitated and care was taken to keep the partial amide salt solution in excess at all times to minimize heavy gel formation. The temperatures of the slurry was maintained during the addition between 61° C. and 64° C. The filtrate from a filtered sample of the slurry had a pH of 7.5.

The slurry was digested by allowing it to stand for eighteen hours without supplying heat or agitation.

30 lbs. of an aqueous solution containing 10% by weight of sulfuric acid were then added to the digested slurry thereby precipitating a fine voluminous precipitate of isophthalic acid in and around the particles of the siliceous amino amide composition. The filtrate from a filtered sample of the slurry had a pH of 3.8. Upon addition of 10% sulfuric acid to this filtrate, a slight white haze developed indicating that practically all of the water soluble isophthalic salt had been converted to the substantially insoluble isophthalic acid.

(D) *Recovery of the siliceous amino composition*

The slurry was heated with agitation to a temperature of 70° C. and filtered. The filter cake was washed four times, each time adding 700 lbs. of water, agitating the slurry, and filtering. The washed filter cake was dried at a temperature of 165° F. and ground in a Metals Disintegrating Company Micro-Pulverizer through a 1/64" screen. A yield of 28 lbs. of a finely ground white material was obtained. The bulking value was determined in the manner heretofore outlined. The bulking value of a 10 gram sample is given in Table I.

The resulting siliceous amino amide composition was divided into seven equal portions. One portion was not ignited and the other six portions were ignited at temperatures varying from 750° F. to 1850° F. The color of the samples during ignition was black due to the presence of the organic matter. Ignition was carried out on each of the six samples in an electrically heated furnace for a period of time until all of the organic matter was completely decomposed leaving only the silica product which was indicated by the return of the white color. At ignition temperatures of up to 1500° F. there was only a slight decrease in volume during the ignition of the siliceous amino compound. At 1850° F. there was an approximate decrease in volume of 50 percent during the ignition of the siliceous amino compound. The relationship of volume shrinkage to ignition temperature is reflected in the bulking value as seen in Table I. Bulking value was determined by the method heretofore outlined. The bulking values for the silicas prepared by igniting the siliceous amino amide composition at the above temperatures are given in Table I.

where the oils were thickened to a solid, the viscosity was too high and could not be measured, hence these readings are designated in Table II by "S" representing solidified. The viscosity of each of the samples is expressed in centipoises at 80° F.

TABLE II.—IGNITION TEMPERATURE AS RELATED TO SOLVENT THICKENING POWER

| Sample | Ignition Temperature, °F. | Viscosity at 80° F. (Centipoises) Percent concentration of silica product in oil | | | | | |
|---|---|---|---|---|---|---|---|
| | | 2.44% | 4.76% | 6.98% | 9.09% | 11.11% | 13.04% |
| 1 | 750 to 850 | 400 | 4,840 | 58,560 | 302,000 | S | S |
| 2 | 1,000 to 1,100 | 240 | 2,640 | 36,840 | 200,800 | S | S |
| 3 | 1,175 to 1,225 | 280 | 1,680 | 17,320 | 123,520 | 776,000 | S |
| 4 | 1,300 to 1,350 | 280 | 1,680 | 14,440 | 115,200 | 624,000 | S |
| 5 | 1,450 to 1,500 | 280 | 800 | 2,480 | 7,000 | 30,000 | 62,880 |
| 6 | 1,850 | 216 | 400 | 1,120 | 3,000 | 8,880 | 21,200 |

TABLE I.—BULKING VALUE AS RELATED TO IGNITION TEMPERATURE

| Sample | Ignition Temperature, °F. | Bulking Value | |
|---|---|---|---|
| | | Before Tapping | After Tapping 10 Times |
| 1 | Not ignited | 220 | 193 |
| 2 | 750 to 850 | 268 | 220 |
| 3 | 1,000 to 1,100 | 230 | 208 |
| 4 | 1,175 to 1,225 | 260 | 230 |
| 5 | 1,300 to 1,350 | 256 | 224 |
| 6 | 1,450 to 1,500 | 232 | 216 |
| 7 | 1,850 | 130 | 110 |

As seen from Table I, the silicas prepared by igniting the siliceous amino amide composition at temperatures from 750° F. to 1500° F. have high bulking values whereas the silica prepared by igniting the siliceous amino amide at temperatures of above 1500° F., such as 1850° F. have low bulking values. Also as seen from Table I, the silicas prepared by igniting the siliceous amino amide composition at temperatures of from about 750° F. to about 1500° F. had the highest bulking values and hence would make the best flatting agents. Also as shown from Table I the silicas prepared by igniting the siliceous amino amide compositions at temperatures of about 1850° F. had the lowest bulking values and hence would be best suited for use as carriers or as diluents.

In addition, we found that the silicas prepared from this siliceous amino amide composition by igniting said composition at a temperature of from 1450° to 1850° F. appeared to be partially hydrophobic in that it resisted wetting out in water for as long as 24 hours even when ignited at 1850° F.

In order to show that the solvent thickening power and grease penetration values of the silicas prepared by igniting siliceous amino compounds varies with the ignition temperature used in preparing the silica, the following test was performed. A sufficient weight of each of the seven samples of ignited silica which were prepared in the manner hereinbefore outlined, were dispersed separately into 200 grams of a naphthenic base oil having a viscosity of 300 Saybolt Universal seconds at 100° F. using an Oster Malt Mixer to prepare a series of greases to produce samples having a silica concentration of 2.44% by weight, 4.76% by weight, 6.98% by weight, 9.09% by weight, 11.11% by weight, and 13.04% by weight for each ignition sample of silica. The viscosity at 80° F. of each of the oil samples containing the several silicas in the aforementioned percentages was determined with a HV-B Model Brookfield Viscosimeter. The results of the viscosity tests are recorded in Table II. In the cases As seen from Table II the oils are thickened to a far greater extent by the silicas prepared by igniting at temperatures of 750° F. to 1350° F., than the silicas ignited at temperatures of 1450° F. to 1850° F. as shown in Table II. Also the silicas prepared by igniting at temperatures of 1450° F. to 1850° F. have poor oil thickening power. Also as seen from Table II, the higher the ignition temperature which is used to prepare the silica, the lower the oil thickening power of the silica.

The oil compositions containing 9.09% by weight, 11.11% by weight and 13.04% by weight of the various silicas prepared by igniting the siliceous amino compound at different temperatures were tested for their penetration values by means of A.S.T.M. Test D 217–52T. In accordance with this test, the lower the penetration value, the harder the grease while the higher the penetration value the softer the grease. These weight percents were chosen since at lower silica concentrations many of the oils were not thickened enough to give a grease and at higher concentrations of silica, many of the greases produced were too solid to obtain readings. The results of the penetration of a cone in tenths of millimeters into the grease is given in Table III. Where the oil was not thickened to an extent sufficient to give a grease, no meaningful readings could be taken by the above penetration test, these results are designated in Table III by the symbol "∞." Where the grease was too solidified to take penetration readings, these results are designated in Table III by the symbol "S."

TABLE III.—IGNITION TEMPERATURE AS RELATED TO GREASE PENETRATION

| Sample | Ignition Temperatures, °F. | Grease Penetration (tenths of Millimeters) Weight percent concentration of Silica Product in Oil | | |
|---|---|---|---|---|
| | | 9.09% | 11.11% | 13.04% |
| 1 | 750 to 850 | 330 | S | S |
| 2 | 1,000 to 1,100 | 336 | S | S |
| 3 | 1,175 to 1,225 | 356 | 312 | S |
| 4 | 1,300 to 1,350 | ∞ | 315 | S |
| 5 | 1,450 to 1,500 | ∞ | ∞ | 336 |
| 6 | 1,850 | ∞ | ∞ | 420+ |

The results of Table III shows that when high ignition temperatures are used to prepare silicas, softer greases are produced. Table III also demonstrates that poor oil thickening is produced by utilizing silicas prepared by ignition at temperatures of 1450 and above, as shown by the very large grease penetration readings of oils utilizing these silicas.

EXAMPLE II

The purpose of this Example II is to demonstrate the preparation of a carbonized silica.

The siliceous amino composition prepared according to Example I was placed in an iron retort and one outlet tube of the retort was sealed off so that the composition would be subjected to an atmosphere which was substantially its own organic decomposition products during ignition. Heating was accomplished with a Bunsen Burner. The temperature of the ignition was from 500° F. to 700° F., and heating was carried out for about 2 hours. The above procedure resulted in a carbonized silica. The heat treated product upon visual examination consisted essentially of silica with a brownish coating.

EXAMPLE III

The purpose of this example is to demonstrate the ignition and burning of another type of siliceous amino composition. All of the parts given are parts by weight.

(A) Preparation of sodium silicate solution 250 parts of a 40° Bé. solution of sodium silicate ($Na_2O:3.22SiO_2$) was added to 1600 parts of water in a reaction vessel equipped with an agitator. The solution was heated to a temperature of 75° C. to 85° C.

(B) Preparation of sodium silicate solution 30 parts of the mono amide of hydrogenated tallow fatty acids and tetraethylenepentamine was melted at a temperature of 80° C. to 90° C. and dispersed with agitation, in 552 parts of water which was at a temperature of 75° C to 80° C. 18.3 parts of an aqueous solution containing 70% acetic acid was then added to the dispersion and mixed therewith at a temperature of from 75° to 80° C. until a clear solution of the mono amide acetate formed.

(C) Preparation of the siliceous amino amide composition

The mono amide acetate solution of part B was slowly added, with agitation, to the heated sodium silicate solution of Part A. The mixture was maintained at a temperature of from 75° to 80° C. for thirty minutes until the formation of a clear yellow slurry indicating the formation of the reaction product of the mono amide acetate with the sodium silicate.

45.7 parts of an aqueous solution containing 35% by weight hydrochloric acid were slowly added to the slurry of the siliceous amino composition to form a slurry containing water insoluble free silica which adsorbed the reaction product to form the siliceous amino composition. The slurry was agitated for about thirty minutes at a temperature of 70° to 75° C. The pH of the slurry was adjusted to between 7.5 to 8. The slurry was then filtered and washed three times, each time mixing the filter cake with approximately 1,000 parts of water, which was at a temperature of 45° to 50° C., for twenty minutes and then filtering. The final filter cake was tray dried in a forced air oven at a temperature of 150° F. to 155° F. to a moisture content of no greater than 1%. The resultant dried siliceous amino amide composition was ground to yield 100 lbs. of product.

A sample of this siliceous amino amide composition (15 grams) was ignited in a nickel crucible at a temperature of from 1250° F. to 1350° F. until the formation of a white powder indicating that all of the organic matter was burned off. A slight decrease in volume during the ignition was observed. The product was a finely divided white silica. The bulking value which was determined in the manner hereinbefore outlined was 170/150 cc. for a 10 gram sample. The original nonignited siliceous amino composition had a bulking value of 150/124 cc. for a 10 gram sample. The silica prepared in this manner was hydrophilic and wet out readily in water. Several samples were prepared by adding a sufficient amount of silica to 200 grams of naphthenic mineral oil having a viscosity of 300 Saybolt Universal seconds at 100° F. to prepare oil samples containing 2.44% by weight of silica, 4.76% by weight of silica, 6.98% by weight of silica, 9.09% by weight of silica and 11.11% by weight of silica. The oil thickening properties of the silica of this example were determined in the same manner as in Example I. The results of the oil thickening properties determination, expressed in centipoises, are set forth in Table IV. The symbol "S" in Table IV has the same meaning as in Table II.

TABLE IV.—IGNITION TEMPERATURE AS RELATED TO SOLVENT THICKENING POWER

| Sample | Ignition Temperature, °F. | Viscosity at 80° F. (Centipoises) Percent of silica or siliceous amino compound in grease composition | | | | |
|---|---|---|---|---|---|---|
| | | 2.44% | 4.76% | 6.98% | 9.09% | 11.11% |
| Ignited siliceous amino composition. | 1,250 to 1,350 | 280 | 720 | 4,200 | 34,400 | 282,000 |

The siliceous amino compound prepared by this example which is ignited at a temperature of 1250° F. to 1350° F. has fair oil thickening properties as shown by Table IV.

EXAMPLE IV

The purpose of this example is to illustrate the igniting and burning of another type of siliceous amino amide composition. The siliceous amino amide composition used in this example was prepared as follows:

(A) Preparation of the silica sol 2.5 grams of sodium fluosilicate was dissolved in 1,000 cc. of water. 100 grams of a 40° Bé. sodium silicate ($Na_2O:3.22SiO_2$) solution was diluted with 100 cc. of water. 17.5 grams of 96% by weight sulfuric acid was diluted with 95 cc. of water. The sodium silicate dilution and the acid dilution were both slowly added with agitation at the same time to the sodium fluosilicate solution. Care was taken during the addition to keep the acid in excess at all times so that the silica sol was acid to Congo red paper. The clear solution was heated with agitation to a temperature of 60° C.

(B) Preparation of the partial amide salt 5.0 grams of the mono amide of hydrogenated tallow fatty acids and 5 grams of aminoethylethanolamine were dissolved in 50 grams of a 320 second Saybold viscosity naphthenic base oil at a temperature of 80° to 85° C. To this solution was then added 1.4 grams of glacial acetic acid thereby forming the partial amide acetate salt. This solution was then emulsified using 43 cc. of water at a temperature of 90° to 95° C.

(C) Preparation of siliceous amino amide composition 61 grams of a 40° Bé. solution of sodium silicate ($Na_2O:3.22SiO_2$) was diluted with 61 cc. of water. The partial amide acetate emulsion of part B and the sodium silicate dilution just prepared were then added with agitation to the silica sol of part A which was at a temperature of 60° C. so as to form a clear yellow slurry which indicated that the siliceous amino amide composition was forming. During the addition care was taken to keep the mono amide acetate emulsion in excess at all times. A sample of the reaction slurry was removed and filtered. The filtrate had a pH of 7.6. The reaction slurry was digested for 19 hours by allowing it to stand at room temperature conditions.

(D) *Recovery of the siliceous amino amide composition*

The digested slurry was heated with agitation to a temperature of 80° C. and then filtered. The filter cake was washed four times, each time agitating the filter cake with 1,000 cc. of water which was at a temperature of 70° to 75° C. and then filtering. The washed filter cake was then dried to a moisture content of 0.9% and was ground to 98 grams of a fine powder in a laboratory Raymond hammer mill.

(E) *Ignition and burning of the siliceous amino composition*

15 grams of the above prepared siliceous amino composition was ignited in a nickel crucible placed in an electrically heated furnace. The ignition temperature was 1850° F. and the ignition was stopped when the silica turned white indicating that all of the organic matter had burned off. During this ignition, there was a decrease in volume of approximately 50 percent. The product obtained was a relatively coarse white silica with a bulking value of 42/38 cc. for a 10 gram sample. The original unignited siliceous amino compound had a bulking value of 58/45 cc. for a 10 gram sample. This bulking value was determined in the manner hereinbefore outlined. The ignition product was hydrophilic and wet out readily in water. The oil thickening properties were determined by preparing samples as in Example I, and are summarized in Table V.

TABLE V.—OIL THICKENING PROPERTIES BEFORE AND AFTER IGNITION AT 1850° F.

| Sample | Ignition Temperature, ° F. | Viscosity at 80° F. (Centipoises) Percent Concentration of a silica in oil | | | | | |
|---|---|---|---|---|---|---|---|
| | | 2.44% | 4.76% | 6.98% | 9.09% | 11.11% | 13.04% |
| Ignited sample | 1,850 | 152 | 176 | 200 | 480 | 920 | 2,000 |

As can be seen from the above table, a silica which is heated to a temperature of 1850° F. has low oil thickening properties. This silica has a low bulking value. Such a silica would be useful as fillers, reinforcement agents, carriers, anti-caking agents, and the like.

EXAMPLE V

The purpose of this example is to demonstrate the high bulking value and low thickening power contained in a silica when using the process of this example. The siliceous amino composition used in this example was prepared substantially in the same manner of Example I.

(A) *Ignition and burning of the siliceous amino amide composition*

10 gram samples of the siliceous amino amide composition prepared in Example I was placed in four separate iron retorts which were then placed in an electrically heated furnace which was at a temperature of 1500° to 1550° F. Heating was continued until all visual evidence of a black or gray coloration had disappeared. The bulking value of the finely divided white silica was determined in the manner hereinbefore outlined. The bulking value thereby obtained was 230/200. This silica had a tendency to float on water and to remain suspended on top of the water after contact with said water for 24 hours. The solvent thickening properties were determined in the manner outlined in Example I by preparing three samples, containing 2.44% by weight, 4.76% by weight and 6.98% by weight of silica dissolved in naphthenic mineral oil having a viscosity of 300 Saybolt Universal seconds at 100° F. The viscosity at 80° F. of each of these samples is given in Table VI.

TABLE VI.—OIL CONCENTRATION OF SILICA PRODUCT IN OIL AND OIL THICKENING POWER AS MEASURED IN CENTIPOISES

| Sample | Ignition Temperature, ° F. | 2.44% | 4.76% | 6.98% |
|---|---|---|---|---|
| Ignited siliceous amino compound. | 1,500 to 1,550 | 266 | 680 | 1,680 |

Thus, it can be seen from Table VI that silica prepared by the igniting and burning of a siliceous amino composition at a temperature of from 1500° to 1550° F. has a low oil thickening power. From the determination of the bulking value, it is seen that the silica prepared by igniting at a temperature of 1500° to 1550° F. has a high bulking value. Hence, this silica is suitable as flatting agent for lacquers, paints, varnishes, etc.

EXAMPLE VI

This example is directed to demonstrating the ignition and burning of another type of siliceous amino composition.

A silica sol was prepared in the same manner as that outlined in Example I(A) except that after the slurry was heated with agitation to 55° C., it was digested by allowing it to stand for 1½ hours at room temperature. After this digestion was completed, the slurry was heat treated by maintaining it at a temperature of 132° F. for approximately 40 minutes. The partial amide salt was prepared in the exact method of Example I(B) except that 60 pounds of naphthenic oil (viscosity of 320 Saybolt Universal seconds at 100° F.) was utilized in place of 60 pounds of varnish makers' and painters' naphtha. This siliceous amino composition was prepared in the exact manner of Example I(C) and filtered in the manner of Example I(D).

The resulting siliceous amino amide composition was divided into two equal portions, each containing seven pounds of the composition. One portion was ignited in a gas fired furnace at a temperature of 1,000° F. to 1100° F. and the other portion was ignited in a gas fired furnace at a temperature of 1400° F. to 1500° F. Heating in both cases was carried out until all visual evidence of a black or grey coloration had disappeared.

*Silica prepared by igniting at temperatures of from about 1000° F.*

The bulking value of the silica prepared by ignition at temperatures of from about 1000° F. to 1100° F. was determined in the manner hereinbefore outlined. The bulking value was 236/202. 20 grams of this silica was mixed by agitation into 200 grams of naphthenic mineral oil having a viscosity of 320 Saybolt Universal seconds at 100° F. The thickening power of the silica which was determined in the manner outlined in Example I was 824,000 centipoises at 60° F. As seen from the above results the silica prepared by igniting at temperatures of from about 1,000° F. to 1100° F. had a high bulking value and a good thickening power.

*Silica prepared by igniting at temperatures of from about 1400° F. to 1500°F.*

The bulking value of the silica prepared by ignition at temperatures of from about 1400° F. to 1500° F. was determined in the manner hereinbefore outlined. The bulking value was 250/240. 20 grams of this silica was mixed by agitation with 200 grams of naphthenic mineral oil having a viscosity of 320 Saybolt Universal seconds at 100° F. The thickening power of the silica which was determined in the manner outlined in Example I was 136,000 centipoises at 60° F. As seen from the above results, the silica prepared by igniting at temperatures of from about 1,400° F. to 1,500° F. had a high bulking value and a poor oil-thickening power.

As is obvious from the above examples, various types of silicas can be prepared by means of the same process by varying the ignition temperature. We can prepare silicas having high bulking value and high oil thickening power. These silicas may be used as thickening, suspending or thixotropic agents. By means of the same process, we may also prepare silicas having high bulking value and low oil thickening power. These silicas are useful for example, as flatting agents, fillers, reinforcement agents, anti-caking agents, and the like. We may also prepare, by means of the same process, a silica having a low bulking value and a low solvent thickening power. Such a silica is desirable where a high concentration of silica is needed, as for example for use as fillers, carriers and/or reinforcing agents or we may prepare relatively coarse silicas when an abrasive action is desired, as in scouring powders.

The process itself is a straightforward one and may be practiced by an operator without specialized training. In addition, we obviate the need for utilizing different processes to prepare different types of silicas. Moreover, using the same process, we are also able to prepare a carbonized silica as previously described. Such carbonized silica could be used to aid the incorporation of silica into rubber and in the field of gas purification.

While this invention has been described in terms of certain preferred embodiments and illustrated by means of specific examples these are illustrative only and this invention is not to be construed as limited except as set forth in the following claims.

What we claim as new and desire to secure by Letters Patent is:

1. The process for preparing silica from a siliceous amino amide composition comprising igniting a siliceous amino amide composition containing from about 10% to 40% by weight of said composition of the reaction product in water of a salt which is at least water-dispersible, said salt being selected from the group consisting of partial amide salts, oxazoline salts, imidazoline salts, and mixtures thereof with a water soluble silicate salt and from about 60% to 90% by weight of said composition, of silica, at temperatures of from about 450° F. to 2,500° F.

2. A process for preparing silica having a high bulking value and high solvent thickening properties from a siliceous amino composition comprising igniting a siliceous amino amide composition containing from about 10% to 40% by weight of said composition of the reaction product in water of a salt which is at least water dispersible, said salt being selected from the group consisting of partial amide salts, oxazoline salts, imidazoline salts, and mixtures thereof, with a water soluble silicate salt and from about 60% to 90% by weight of said composition of silica, at temperatures of from 450° F. to 1,400° F.

3. A process for preparing silicas having a high bulking value and low solvent thickening properties from a siliceous amino amide composition comprising igniting a siliceous amino amide composition containing from about 10% to 40% by weight of said composition of the reaction product in water of a salt which is at least water dispersible, said salt being selected from the group consisting of partial amide salts, oxazoline salts, imidazoline salts, and mixtures thereof with a water-soluble silicate salt and from about 60% to 90% by weight of said composition, of silica, at temperatures of from about 1450° F. to 1600° F.

4. A process for preparing silicas having a low bulking value and a low oil-thickening power from a siliceous amino amide composition comprising igniting a siliceous amino amide composition containing from about 10% to 40% by weight of said composition of the reaction product in water of a salt which is at least water dispersible, said salt being selected from the group consisting of partial amide salts, imidazoline salts, oxazoline salts, and mixtures thereof with a water-soluble silicate salt and from about 60% to 90% by weight of said composition, of silica, at temperatures of from about 1650° F. to 2500° F.

5. A process for preparing carbonized silica comprising the step of igniting and heating a siliceous amino amide composition containing from about 10% to 40% by weight of said composition of the reaction product in water of a salt which is at least water dispersible, said salt being selected from the group consisting of partial amide salts, oxazoline salts, imidazoline salts, and mixtures thereof with a water soluble silicate salt and from about 60% to 90% by weight of said composition, of silica, at temperatures of from about 400° F. to about 1,000° F. for a period of time sufficient to drive off all of volatile matter from said siliceous amino amide composition, said heating being carried out in an oxygen free atmosphere.

References Cited by the Examiner

UNITED STATES PATENTS

| | | | |
|---|---|---|---|
| 1,156,742 | 10/1915 | Blardone et al. | 106—307 |
| 2,156,591 | 5/1939 | Jacobson | 106—307 |
| 2,578,605 | 12/1951 | Sears et al. | 106—288 |
| 2,948,679 | 8/1960 | Rees et al. | 23—182 |
| 2,967,828 | 1/1961 | Ihde | 106—288 |
| 3,094,428 | 6/1963 | Hamilton et al. | 106—307 |
| 3,110,606 | 11/1963 | Bertorelli | 106—288 |
| 3,132,071 | 5/1964 | King | 252—28 |
| 3,208,823 | 9/1965 | Baker et al. | 106—288 |

TOBIAS E. LEVOW, *Primary Examiner.*

J. POER, S. E. MOTT, *Assistant Examiners.*